United States Patent
Krueger

(10) Patent No.: US 7,725,678 B2
(45) Date of Patent: May 25, 2010

(54) METHOD AND APPARATUS FOR PRODUCING AN INDEX VECTOR FOR USE IN PERFORMING A VECTOR PERMUTE OPERATION

(75) Inventor: Steven Krueger, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 8 days.

(21) Appl. No.: 11/060,208

(22) Filed: Feb. 17, 2005

(65) Prior Publication Data
US 2006/0184765 A1    Aug. 17, 2006

(51) Int. Cl.
*G06F 9/00*    (2006.01)
(52) U.S. Cl. .......................................... 712/4
(58) Field of Classification Search ............... 712/5, 712/300, 4
See application file for complete search history.

(56) References Cited

U.S. PATENT DOCUMENTS

| | | | | |
|---|---|---|---|---|
| 4,490,786 A | * | 12/1984 | Nakatani | 712/5 |
| 4,873,630 A | * | 10/1989 | Rusterholz et al. | 712/3 |
| 4,881,168 A | * | 11/1989 | Inagami et al. | 712/5 |
| 5,109,523 A | * | 4/1992 | Kanada et al. | 712/7 |
| 5,511,210 A | * | 4/1996 | Nishikawa et al. | 712/5 |
| 5,553,309 A | * | 9/1996 | Asai et al. | 710/34 |
| 5,903,769 A | * | 5/1999 | Arya | 712/5 |
| 6,446,198 B1 | | 9/2002 | Sazegari | |
| 2004/0133831 A1 | * | 7/2004 | Williams et al. | 714/726 |

OTHER PUBLICATIONS

Hennessy, John L. and David A. Patterson. Computer Architecture: A Quantitative Approach. 2nd Ed. Morgan: 1996. p. 115-116.*
AltiVec™ Technology Programming Environments Manual, Rev. 2.0, Feb. 2, 2002, Motorola, Inc., p. 6-112 discussing "Vperm" Vector permute instruction is of interest.

* cited by examiner

*Primary Examiner*—Aimee J Li
(74) *Attorney, Agent, or Firm*—Ronald O. Neerings; Wade James Brady, III; Frederick J. Telecky, Jr.

(57) ABSTRACT

A method for generating a permutation index vector includes receiving a condition vector and performing an index generation function using the condition vector in order to generate the permutation index vector. An index vector generation circuit is also disclosed.

19 Claims, 3 Drawing Sheets

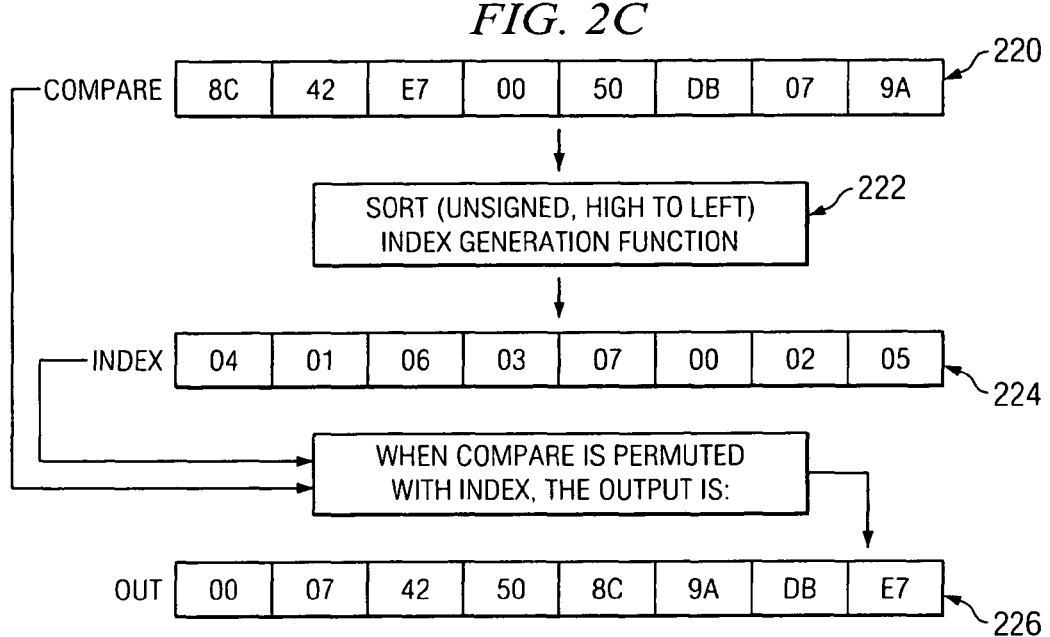
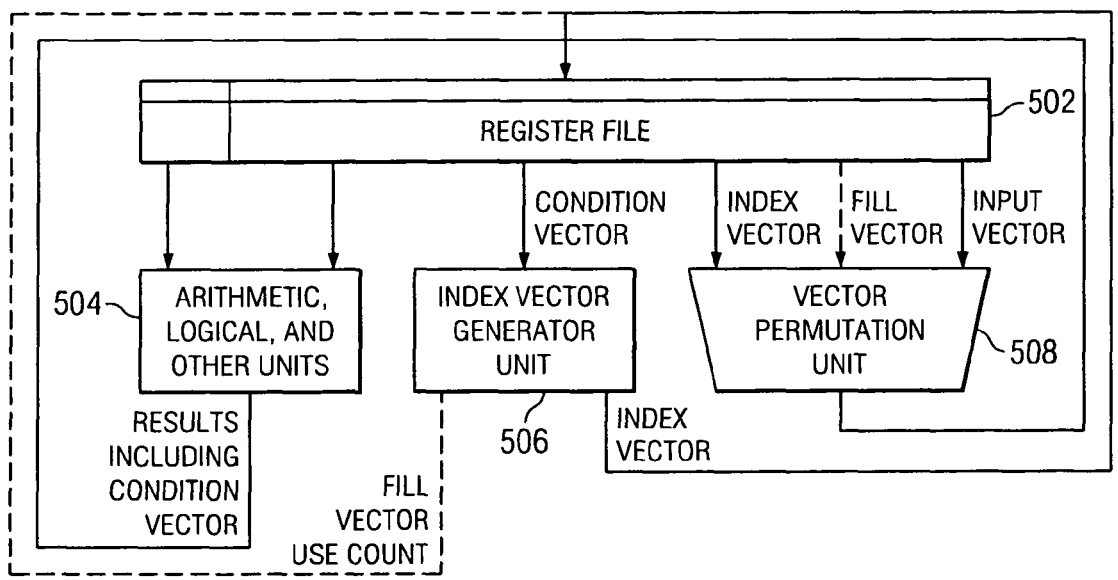

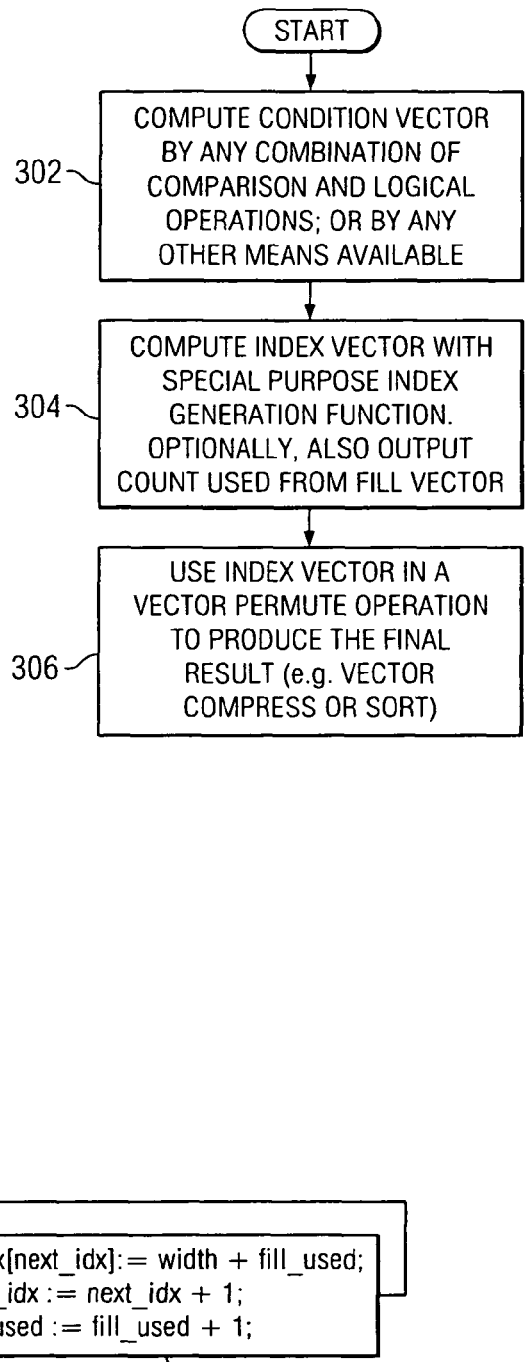
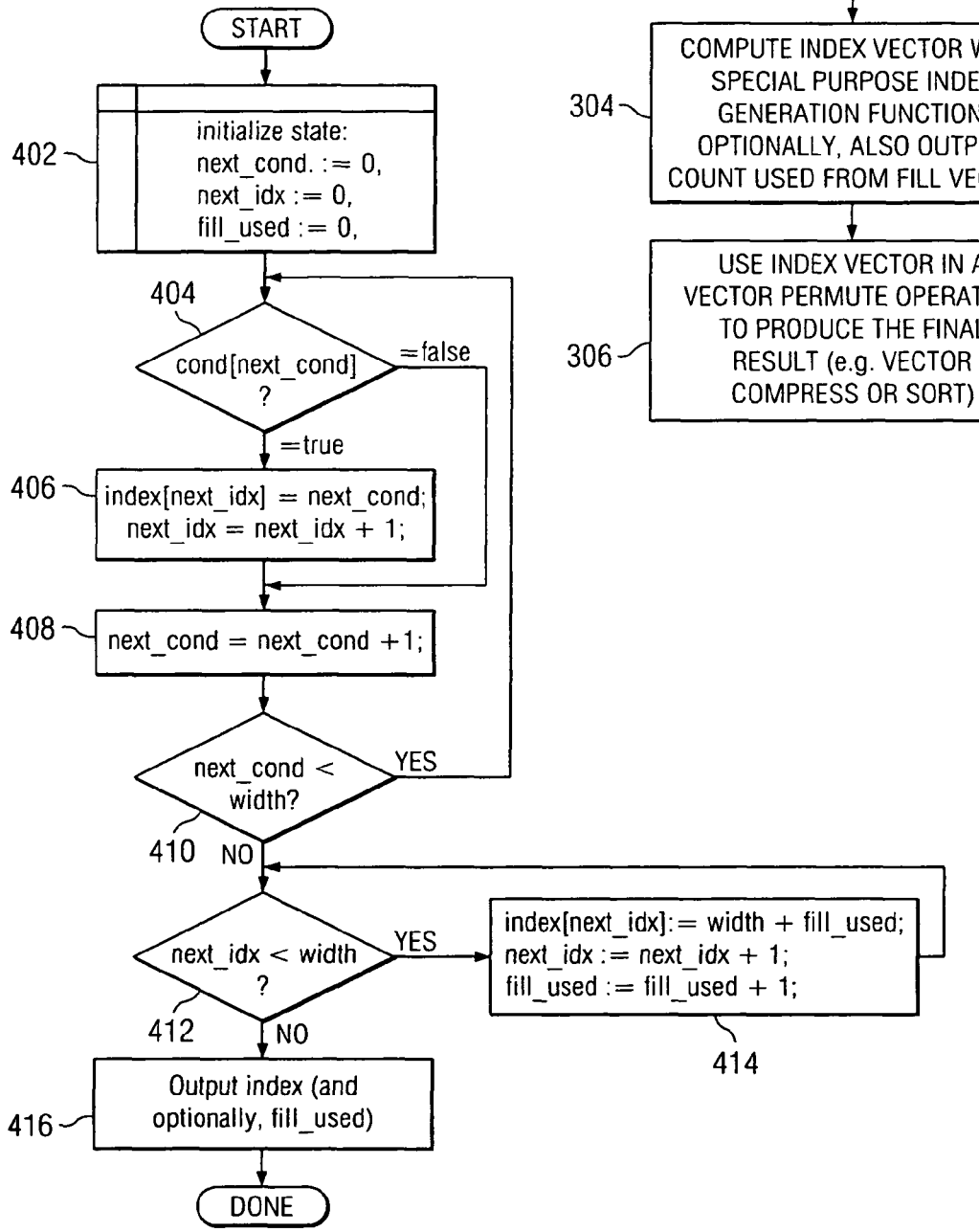

METHOD AND APPARATUS FOR PRODUCING AN INDEX VECTOR FOR USE IN PERFORMING A VECTOR PERMUTE OPERATION

FIELD OF THE INVENTION

The invention relates in general to the field of electronics and more specifically to vector operations.

BACKGROUND OF THE INVENTION

Vector computers perform operations on each element of a vector. For example, the corresponding elements of two vectors can be added to produce a vector of sums. Single Instruction Multiple Data (SIMD) architectures perform vector operations on several data elements in parallel. This is sometimes referred to as short vector architecture.

Permutation operations can reorder the elements of a vector under the control of a permutation index vector. For example, the elements of a vector can be reversed by permuting the first element to last, etc.

Some high level operations require the selection of a permutation based on data available to a program. For example, the permutation that sorts a vector depends on the relative magnitudes of the vector elements themselves. These data-based permutation operations are not supported well on existing SIMD architectures because many steps are required to produce the permutation index vector.

BRIEF DESCRIPTION OF THE DRAWINGS

FIG. 2C shows a diagram that highlights using a different index generation function to produce an index vector and using the index vector to permute the input into an output in accordance with an embodiment of the invention.

FIG. 3 shows a flow chart highlighting some of the steps taken in order to perform a vector operation in accordance with an embodiment of the invention.

FIG. 4 shows a flow chart for generating an index vector in accordance with an embodiment of the invention.

FIG. 5 shows a block diagram of a system in accordance with an embodiment of the invention.

DETAILED DESCRIPTION OF THE PREFERRED EMBODIMENTS

Figure 1:
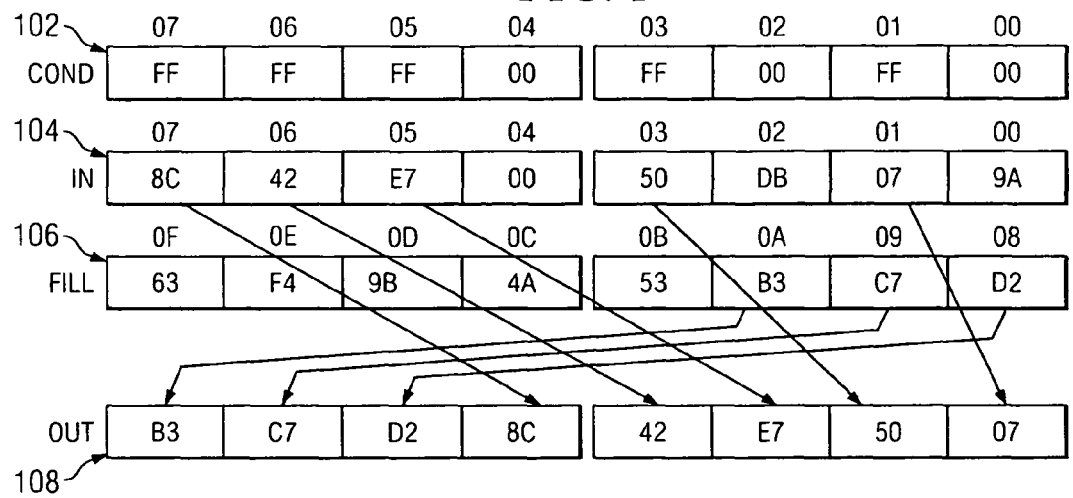
FIG. 1 shows a diagram of a vector compress in accordance with an embodiment of the invention.

Referring to FIG. 1, there is shown the results of a vector compress (compression) process in accordance with an embodiment of the invention. A condition (cond) register 102 selects which bytes of a first or "in" vector 104 are to be compressed into a second or "out" vector 108. The values stored in the condition register 102 can be the result of some type of comparison such as a vector compare or other operation previously performed within a system. The locations in the "in" register 104 that correspond to the byte locations (e.g., in this example locations 0-7) in the condition register 102 having an "FF" or "true" condition state are transferred to the rightmost byte of the out register 108 not yet filled by some other byte of the "in" register to the right of this byte in the "in" register. Those byte locations in the condition register 102 having a "00" or "false" condition states are not transferred to the out register 108. As an optional feature and in order to provide further compression capability, any remaining space in the out register 108 is filled from a fill register 106. The result of this process is to compress out the bytes of the "in" vector that correspond to "false" bytes in the "condition" vector.

In this illustrative example, the condition register (condition vector or vector register) 102 stores an FF value in a byte location when the condition being monitored is true or not equal to zero. A "00" value is stored in particular byte location(s) when the condition being monitored is false or is equal to zero. It should be noted that the particular value used to denote the different conditions (e.g., true or false, etc.) can be modified depending on the particular system design. It should also be noted that the roles of "true" and "false" bytes in the "condition" register could be interchanged without materially affecting this process.

In accordance with an embodiment of the invention, rather than build a vector compress function, a special successive priority encoder function is used to generate the vector permutation indices as discussed previously. Then a permutation unit and/or instruction(s) that may already be present in a system may be used to perform the byte permutation to accomplish the vector compress operation. This provides for easier pipelining as compared to using a single complex instruction for the vector compress operation. The successive priority encoder required to perform the vector compress function discussed above requires in the order of hundreds not thousands of logical gates to design, allowing for a simple and inexpensive overall design.

The technique of generating a permutation vector with a specialized instruction and then using the permutation unit or instruction can also be used for other functions such as when performing a sort operation or a vector compress left operation. Using the technique in accordance with another embodiment of the invention, a vector compress left can be performed by substituting "left" for "right" and "leftmost" for "rightmost" in the previously described description of the vector compress process.

Figure 2A:
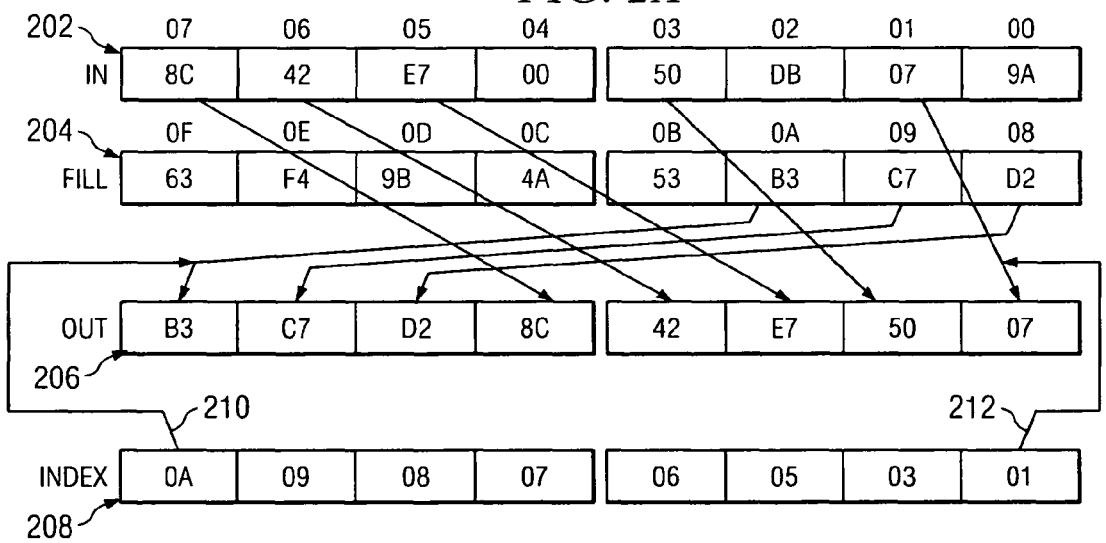
FIG. 2A shows the generation of an index vector in accordance with an embodiment of the invention.

An index vector (also referred to as a permutation index vector or index vector register) 208 for the illustrative example shown in FIG. 1 is shown in FIG. 2A. Each byte position in the index vector 208 corresponds to a byte at the same position in the "out" vector. Each byte of the index vector contains the index that refers to one of the bytes of the "in" vector. The corresponding byte of the "out" vector is set to the value of the indexed byte of the "in" vector. Several other refinements are possible and are present in various implementations of permutation operations, including multiple-register-wide "in" vectors and handling of out-of-range index values. For example the rightmost byte of the index register 208 contains the position "01"; the out register 206 will be loaded in position "00" with the value "07" from position "01" of the input vector 202, as shown by line 212. It should be noted that although this discussion has been based on bytes any data width can also be used, for example, bit, word, etc. It should be also noted that the operation of how the index vector 208 works to transform an input vector to an output vector describes how permutation operations known in the art function and is necessary to understand the present invention.

Figure 2B:
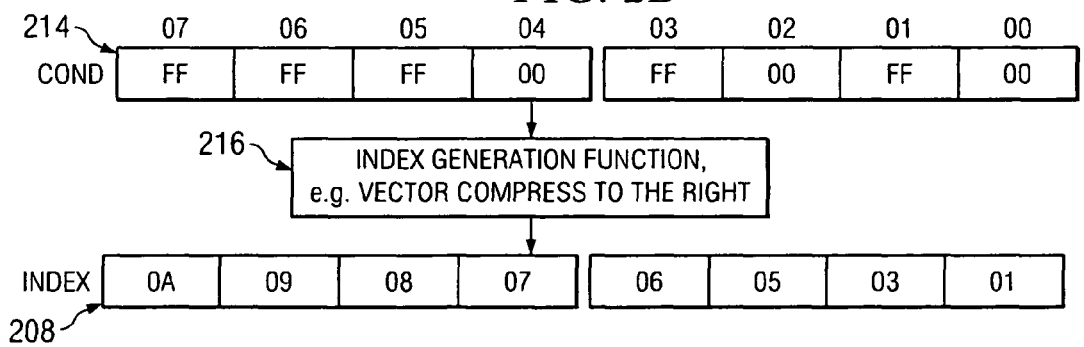
FIG. 2B shows the process of index generation in accordance with an embodiment of the invention.

FIG. 2B shows an overview diagram highlighting how from a condition vector 214, the system derives an index vector 208 by performing an index generation function 216. The index generation function can comprise, as illustrative examples, a vector compress to the right or left (a vector sort as discussed in FIG. 2C or some other function can also be performed).

In FIG. 2C, there is shown the use of a sort function that in this illustrative example is an unsigned sort, high to left function 222. The compare 220 is sorted using the index generation function 222 to generate index 224. When the compare 220 is permuted with the index 224, out vector 226 is generated.

Referring to FIG. 3, there is shown a flowchart highlighting the steps for performing a vector compress in accordance with an embodiment of the invention. In 302 the condition vector is computed using any combination of comparison and logical operations or any other means available. How the condition vector is computed will depend on the system requirements for a particular system design. In 304, an examination of a condition vector is performed and a successive priority encoding of the bytes of the condition vector is performed to produce the index vector. The successive priority encoding produces the index vector where each byte location contains a count "I" in the range 0-7 which is the position in the condition vector of the "I"th true condition in the condition vector. If not all bytes of the condition vector are true, then the remaining bytes of the index vector are filled with successive integers starting at 8.

This index generation procedure produces an index vector that can be used directly as the index vector to a vector permutation instruction to perform the vector compress operation. Those locations in the input vector that correspond to locations in the condition vector that are in a first state such as true state are loaded into an output vector, for example from right to left in 304, although in another embodiment, the output vector can be loaded from left to right, or using some other function.

Those locations in the input vector that correspond to locations in the condition vector that are in a second state such as a false state, are not loaded into the output vector. In an optional state, any empty locations in the output vector can be filled using a fill vector. In 304, the index vector is computed with a special purpose index generation function. Optionally, a count of the number of bytes or elements shifted in from the fill vector can also be maintained in order to help keep track of the number of bytes loaded in from the fill vector. In 306, the index vector is used in a conventional vector permute function to perform a permutation of the vector information to produce the final result (e.g., vector compress or sort).

One advantage of separating the generation of the index vector from its use to move data is that in some uses there are several vectors whose compression is controlled by the same condition vector. For example, in graphics data a stream of vertices might be represented as three vectors, a vector each for X, Y and Z coordinates. The first vertex is represented by the first element in each of the three vectors. A computation might compute the visibility of each vertex as a condition vector that can be used to compress the X, Y and Z vectors to contain only the visible points. By splitting the vector compress operation into two parts, the index vector generation can be performed once and the resulting index vector can be used for each of the three vectors.

There are other advantages to splitting a complex operation such as vector compression into separate instructions. For example, two less complex operations may be implemented at a higher clock rate or shallower pipeline depth than when using a single complex operation. As another example, splitting the operations exposes the data dependency (the index vector) between the two parts and allows the compiler or programmer to schedule the dependency to reduce its impact on the program's run time.

Referring now to FIG. 4, there is shown a flowchart highlighting some of the steps taken for generating an index vector for the vector compress right operation in accordance with one embodiment of the invention. The operations performed in the flowchart of FIG. 4 implement operation 304. In 402, the variables that are used, "next_cond", "next_idx" and "fill_used" are initialized. The fill_used variable represents the number of locations from the fill register that have been used in the index register. The next_cond variable keeps track of the location in the condition register that is currently being used to make a load determination into the index register. The next_idx variable keeps track of the current location of the index register that is being filled.

In decision step 404, it is determined if the condition register has a true or false condition state for the corresponding location in the condition register. If the condition for that particular position is false (e.g., 00 as the example shown in FIG. 1) then the process moves on to 408 wherein the next_cond variable is incremented. If in 404 it is determined that the condition at the current position is true, in 406 the current position in the index register is loaded with the current position in the condition register. In 406, the index position (next_idx) is also incremented (next_idx=next_idx+1). In 410 it is determined if the next_cond is less than the width of the condition register (e.g., 8 bytes), if the value of the next_cond shows that the end of the register has been reached (next_cond=width), the process moves to 412. In 412 it is determined if the index position has reached the end of the index register, if it has, the routine goes to 416. In 416, the index register and optionally the number of bytes from the fill register used (fill_used) are outputted to the appropriate system circuit. If in 410 it is determined that the end of the condition register has not been reached, the routine loops back to 404.

If it is determined that the end of the index register has not been reached in 412 next_idx=width), the routine moves to 414 wherein the index register is at the current position is set to width plus the number of fill locations used so far. This value is used because when the index vector is used in a vector permute instruction these index values can select values from the fill register. The fill count is incremented (fill_used=fill_used+1) and the next index position is also incremented (next_idx=next_idx+1).

In FIG. 5 there is shown a system in accordance with an embodiment of the invention. The system includes a register file 502 that contains the necessary register information that is to be used. Arithmetic, logical and other units 504 are coupled to the register file and perform the necessary logical and comparison operations to generate the condition vector for the system. The condition vector is provided to the index vector generation unit 506, which performs an index generation function as for example previously discussed to generate the index vector. It can optionally also provide a count of the fill vector elements used, a useful quantity in some applications. The index vector, fill vector and input vector are all input into the vector permutation unit 508 in order to perform the permutation. The results of the vector permutation can then be sent to unit 504 for use by the system.

Although illustrative embodiments of the invention have been described above in detail, they do not limit the scope of the invention, which can be practiced in a variety of embodiments. By compacting a SIMD vector and filling the remaining space using data from another vector (e.g., fill vector) and using a special successive priority encoder function to generate the vector permutation indices, it helps make it easier to perform the byte permutation using an existing permutation function (e.g., Altivec's vector permutation function). Other functions such as sort and compress left can also be performed by the compress logic 410 in other applications of the invention.

What is claimed is:

1. A method for building and using a permutation index vector comprising a plurality of indices, comprising:
   in response to a first instruction, the steps of:
      receiving a condition vector into a condition vector register; and
      performing an index generation function using the condition vector in order to generate the permutation index vector by successively evaluating each different condition value in the condition vector one at a time to determine if each respective different condition value is set to a predetermined state and storing an index value to a consecutive one of the plurality of indices of the permutation index vector in response to a determination that a respective condition value in the condition vector is set to the predetermined state; and
   in response to a second instruction, using the plurality of indices of the permutation index vector to form a resultant vector into a resultant vector register, wherein each index value of the plurality of indices at a location in the permutation index vector identifies a location in one or more input vectors from which a data value is taken and located in a corresponding location in the resultant vector.

2. A method as defined in claim 1, wherein the index generation function comprises a vector compress function.

3. A method as defined in claim 2, wherein the vector compress function includes compressing the contents of the one or more input vectors, and wherein the one or more input vectors comprise a first input vector and a second (fill) vector.

4. A method as defined in claim 3, further comprising: outputting a fill vector use count.

5. A method as defined in claim 4, wherein the fill vector use count provides information as to how many data locations in the fill vector were used during the vector compress function.

6. A method as defined in claim 2, wherein the vector compress is performed from left to right or right to left.

7. A method as defined in claim 1, wherein the index generation function is performed using a successive priority encoder.

8. A method as defined in claim 1, wherein the input and resultant vectors have the same length.

9. A method as defined in claim 1, wherein the using step comprises:
   using the permutation index vector register to perform a Single-Instruction Multiple-Data (SIMD) vector permutation function in order to produce a compressed result in the resultant vector register.

10. A method as defined in claim 1, further comprising: loading any empty location in the resultant vector with data from a fill vector register.

11. A method as defined in claim 1, further comprising: loading any empty locations in the permutation index vector with indices of locations in a fill vector register.

12. The method of claim 1 wherein the successively evaluating step comprises:
    advancing a first variable to identify each different condition value position in the condition vector at each respective different time; and
    in response to a determination that a respective condition value in the condition vector and identified by the first variable is set to the predetermined state, loading the first variable into the permutation index vector.

13. The method of claim 1 and further comprising, for each remaining index in the plurality of indices not receiving an index value in response to a determination of a condition value in the condition vector being set to the predetermined state, filling the remaining index with a respective and successive integer starting from a predetermined value, wherein the predetermined value is a value of one greater than a last index value stored in the permutation index vector in response to a determination of a condition value in the condition vector being set to the predetermined state.

14. An index vector generation circuit for generating an index vector comprising a plurality of indices, comprising:
    an input for receiving a condition vector; and
    a successive priority encoder coupled to the input, wherein the successive priority encoder is operable to use the condition vector to produce the plurality of indices of the index vector and comprises:
       means for successively evaluating each different condition value in the condition vector one at a time to determine if each respective different condition value is set to a predetermined state; and
       means, responsive to the means for successively evaluating, for storing an index value to a consecutive one of the plurality of indices of the index vector in response to a determination that a respective condition value in the condition vector is set to the predetermined state.

15. An index vector generation circuit as defined in claim 14, further comprising:
    an output coupled to the successive priority encoder for providing a fill vector use count.

16. An index vector generation circuit as defined in claim 15, wherein the condition vector is provided by a register file.

17. The index vector generation circuit as defined in claim 14:
    wherein the means for successively evaluating comprises a first variable to identify each different condition value position in the condition vector at each respective different time; and
    wherein the means for providing an index value comprises means, in response to a determination that a respective condition value in the condition vector and identified by the first variable is set to the predetermined state, for loading the first variable into the index vector.

18. A method for building and using a permutation index vector comprising a plurality of indices, comprising:
    receiving a condition vector into a condition vector register; and
    performing an index generation function using the condition vector in order to generate the permutation index vector by successively evaluating each different condition value in the condition vector one at a time to determine if each respective different condition value is set to a predetermined state
    and storing an index value to a consecutive one of the plurality of indices of the permutation index vector in response to a determination that a respective condition value in the condition vector is set to the predetermined state.

19. The method of claim 18 and further comprising using the plurality of indices of the permutation index vector to form a resultant vector into a resultant vector register, wherein each index value of the plurality of indices at a location in the permutation index vector identifies a location in one or more input vectors from which a data value is taken and located in a corresponding location in the resultant vector.

* * * * *